(12) United States Patent
Nemirovsky et al.

(10) Patent No.: US 7,406,586 B2
(45) Date of Patent: Jul. 29, 2008

(54) FETCH AND DISPATCH DISASSOCIATION APPARATUS FOR MULTI-STREAMING PROCESSORS

(75) Inventors: Mario Nemirovsky, Saratoga, CA (US); Adolfo Nemirovsky, San Jose, CA (US); Narendra Sankar, Campbell, CA (US); Enrique Musoll, San Jose, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 11/539,322

(22) Filed: Oct. 6, 2006

(65) Prior Publication Data

US 2007/0260852 A1 Nov. 8, 2007

Related U.S. Application Data

(63) Continuation of application No. 09/706,154, filed on Nov. 3, 2000, now Pat. No. 7,139,898.

(51) Int. Cl.
*G06F 9/30* (2006.01)

(52) U.S. Cl. .................................. 712/215

(58) Field of Classification Search ............... 712/215, 712/206
See application file for complete search history.

(56) References Cited

U.S. PATENT DOCUMENTS

| 3,771,138 | A | 11/1973 | Celtruda et al. |
| 4,916,652 | A | 4/1990 | Schwarz et al. |
| 5,404,469 | A | 4/1995 | Chung et al. |
| 5,430,851 | A | 7/1995 | Hirata et al. |
| 5,574,939 | A | 11/1996 | Keckler et al. |
| 5,604,909 | A | 2/1997 | Joshi et al. |
| 5,699,537 | A | 12/1997 | Sharangpani et al. |
| 5,724,565 | A | 3/1998 | Dubey et al. |
| 5,742,782 | A | 4/1998 | Ito et al. |
| 5,745,725 | A | 4/1998 | Simpson |
| 5,745,778 | A | 4/1998 | Alfieri |
| 5,812,811 | A | 9/1998 | Dubey et al. |

(Continued)

OTHER PUBLICATIONS

Diefendorff, Keith. "WinChip4 Thumbs Nose at ILP." Microprocessor Report, http://www.mdronline.com/mpr/h/19981207/121605.html Dec. 7, 1998.

(Continued)

*Primary Examiner*—Eric Coleman
(74) *Attorney, Agent, or Firm*—Sterne Kessler Goldstein Fox PLLC

(57) ABSTRACT

A pipelined multistreaming processor has an instruction source, a plurality of streams fetching instructions from the instruction source, a dispatch stage for selecting and dispatching instructions to a set of execution units, a set of instruction queues having one queue associated with each stream in the plurality of streams, and located in the pipeline between the instruction cache and the dispatch stage, and a select system for selecting streams in each cycle to fetch instructions from the instruction cache. The processor is characterized in that the select system selects one or more streams in each cycle for which to fetch instructions from the instruction cache, and in that the number of streams selected for which to fetch instructions in each cycle is fewer than the number of streams in the plurality of streams.

20 Claims, 3 Drawing Sheets

U.S. PATENT DOCUMENTS

| | | | |
|---|---|---|---|
| 5,900,025 A | | 5/1999 | Sollars |
| 5,907,702 A | * | 5/1999 | Flynn et al. .................. 718/108 |
| 5,913,049 A | | 6/1999 | Shiell et al. |
| 5,933,627 A | | 8/1999 | Parady |
| 6,092,175 A | | 7/2000 | Levy et al. |
| 6,105,053 A | | 8/2000 | Kimmel et al. |
| 6,105,127 A | | 8/2000 | Kimura et al. |
| 6,141,746 A | | 10/2000 | Kawano et al. |
| 6,219,780 B1 | | 4/2001 | Lipasti |
| 6,343,348 B1 | | 1/2002 | Tremblay et al. |
| 6,378,063 B2 | | 4/2002 | Corwin et al. |
| 6,470,443 B1 | | 10/2002 | Emer et al. |
| 6,542,991 B1 | | 4/2003 | Joy et al. |
| 6,622,240 B1 | | 9/2003 | Olson et al. |
| 6,691,221 B2 | | 2/2004 | Joshi et al. |
| 6,968,444 B1 | * | 11/2005 | Kroesche et al. ............ 712/208 |
| 7,035,998 B1 | | 4/2006 | Nemirovsky et al. |
| 7,046,677 B2 | * | 5/2006 | Monta et al. ............. 370/395.4 |

OTHER PUBLICATIONS

Diefendorff, Keith. "Compaq Chooses SMT for Alpha." Microprocessor Report, http://www.mdronline.com/mpr/h/19991206/1131601.html Dec. 6, 1999.

Diefendorff, Keith. "Jalapeno Powers Cyrix's M3." Microprocessor Report. http://www.mdronline.com/mpr/h/19981116/121507.html, Nov. 16, 1998.

Eggers et al. "Simultaneous Multithreading: A Platform for Next-Generation Processors." Sep. 1998, pp. 12-19, IEEE Micro.

Michael Slater. "Rise Joins x86 Fray with mP6." Microprocessor Report. http:/www.mdronline.com/mpr/h/19981116/121501/html. Nov. 16, 1998.

Becker et al. The PowerPC 601 Microprocessor, Oct. 1993. pp. 54-68. IEEE Micro.

*The PowerPC Architecture: A Specification for a New Family of RISC Processors.* Second Edition, Morgan Kaufmann. San Francisco. pp. 70-72. (May 1994).

*MC68020 32-Bit Microprocessor User's Manual.* Third Edition. Prentice Hall, New Jersey. pp. 3-125, 3-126, and 3-127 (1989).

M.J. Potel. "Real-Time Playback in Animation Systems." Proceedings of the 4th Annual Conference on Computer Graphis and Interactive Techniques, San Jose, CA. pp. 72-77 (1977).

*ARM Architecture Reference Manual.* Prentice Hall. pp. 3-41, 3-42, 3-43, 3-67, 3-68 (1996).

*ESA/390 Principles of Operation.* IBM Library Server, Table of Contents and Para.7.5.31 and 7.5.70 (1993). (available at http://publibz.boulder.ibm.com/cgi-bin/bookmgr_OS390/BOOK/DZ9AR001/CCONTENTS).

*MC88110 Second Generation RISC Microprocessor User's Manual.* Motorola, Inc., pp. 10-66, 10-67 and 10-71 (1991).

Diefendorff, Keith et al. "Organization of the Motorola 88110 Superscalar RISC Microprocessor." *IEEE Micro.* vol. 12, No. 2, pp. 40-63 (1992).

Kane, Gerry. *PA-RISC 2.0 Architecture.* Prentice Hall, New Jersey. pp. 7-106 and 7-107 (1996).

Diefendorff, Keith et al. "AltiVec Extension to PowerPC Accelerates Media Processing." *IEEE Micro.* vol. 20, No. 2, pp. 85-95 (Mar.-Apr. 2000).

Gwennap, Linley. "Digital 21264 Sets New Standard." *Microprocessor Report.* vol. 20, No. 14. 11 Pages (Oct. 28, 1999).

Diefendorff, Keith. "Power4 Focuses on Memory Bandwidth." *Microprocessor Report.* vol. 13, No. 13, 13 pages (Oct. 6, 1999).

Diefendorff, Keith. "K7 Challenges Intel." *Microprocessor Report.* vol. 12, No. 14, 7 pages (Oct. 26, 1998).

* cited by examiner

FETCH AND DISPATCH DISASSOCIATION APPARATUS FOR MULTI-STREAMING PROCESSORS

Cross-Reference to Related Documents

This application is a continuation of U.S. application Ser. No. 09/706,154, entitled "Fetch and dispatch disassociation apparatus for multistreaming processors ", filed on Nov. 3, 2000, now U.S. Pat. No. 7,139,898, the entirety of which is incorporated herein by reference.

FIELD OF THE INVENTION

The present invention is in the field of digital processing and pertains more particularly to apparatus and methods for fetching and dispatching instructions in dynamic multi-streaming processors.

BACKGROUND OF THE INVENTION

Conventional pipelined single-stream processors incorporate fetch and dispatch pipeline stages, as is true of most conventional processors. In such processors, in the fetch stage, one or more instructions are read from an instruction cache and in the dispatch stage, one or more instructions are sent to execution units (EUs) to execute. These stages may be separated by one or more other stages, for example a decode stage. In such a processor the fetch and dispatch stages are coupled together such that the fetch stage generally fetches from the instruction stream in every cycle.

In multistreaming processors known to the present inventors, multiple instruction streams are provided, each having access to the execution units. Multiple fetch stages may be provided, one for each instruction stream, although one dispatch stage is employed. Thus, the fetch and dispatch stages are coupled to one another as in other conventional processors, and each instruction stream generally fetches instructions in each cycle. That is, if there are five instruction streams, each of the five fetches in each cycle, and there needs to be a port to the instruction cache for each stream, or a separate cache for each stream.

In a multistreaming processor multiple instruction streams share a common set of resources, for example execution units and/or access to memory resources. In such a processor, for example, there may be M instruction streams that share Q execution units in any given cycle. This means that a set of up to Q instructions is chosen from the M instruction streams to be delivered to the execution units in each cycle. In the following cycle a different set of up to Q instructions is chosen, and so forth. More than one instruction may be chosen from the same instruction stream, up to a maximum P, given that there are no dependencies between the instructions.

It is desirable in multistreaming processors to maximize the number of instructions executed in each cycle. This means that the set of up to Q instructions that is chosen in each cycle should be as close to Q as possible. Reasons that there may not be Q instructions available include flow dependencies, stalls due to memory operations, stalls due to branches, and instruction fetch latency.

What is clearly needed in the art is an apparatus and method to de-couple dispatch operations from fetch operations. The present invention, in several embodiments described in enabling detail below, provides a unique solution.

SUMMARY OF THE INVENTION

In a preferred embodiment of the present invention a pipelined multistreaming processor is provided, comprising an instruction source, a plurality of streams fetching instructions from the instruction source, a dispatch stage for selecting and dispatching instructions to a set of execution units, a set of instruction queues having one queue associated with each stream in the plurality of streams, and located in the pipeline between the instruction source and the dispatch stage, and a select system for selecting streams in each cycle to fetch instructions from the instruction source. The processor is characterized in that the number of streams selected for which to fetch instructions in each cycle is fewer than the number of streams in the plurality of streams.

In some embodiments the number of streams in the plurality of streams is eight, and the number of streams selected for which to fetch instructions in each cycle is two. Also in some embodiments the select system monitors a set of fetch program counters (FPC) having one FPC associated with each stream, and directs fetching of instructions beginning at addresses according to the program counters. In still other embodiments each stream selected to fetch is directed to fetch eight instructions from the instruction cache.

In some embodiments there is a set of execution units to which the dispatch stage dispatches instructions. In some embodiments the set of execution units comprises eight Arithmetic-Logic Units (ALS), and two memory units.

In another aspect of the invention, in a pipelined multistreaming processor having an instruction queue, a method for decoupling fetching from a dispatch stage is provided, comprising the steps of (a) placing a set of instruction queues, one for each stream, in the pipeline between the instruction queue and the dispatch stage; and (b) selecting one or more streams, fewer than the number of streams in the multistreaming processor, for which to fetch instructions in each cycle from an instruction source.

In some embodiments of the method the number of streams in the plurality of streams is eight, and the number of streams selected for which to fetch instructions in each cycle is two. In some embodiments the select system monitors a set of fetch program counters (FPC) having one FPC associated with each stream, and directs fetching if instructions beginning at addresses according to the the to the program counters. In other embodiments each stream selected to fetch is directed to fetch eight instructions from the instruction source. In preferred embodiments, also, the dispatch stage dispatches instructions to a set of execution units, which may comprise eight Arithmetic-Logic Units (ALS), and two memory units.

In embodiments of the present invention, described in enabling detail below, for the first time apparatus and methods are provided for a decoupling fetch and dispatch in processors, and particularly in multistreaming processors.

DESCRIPTION OF THE PREFERRED EMBODIMENTS

Figure 1:
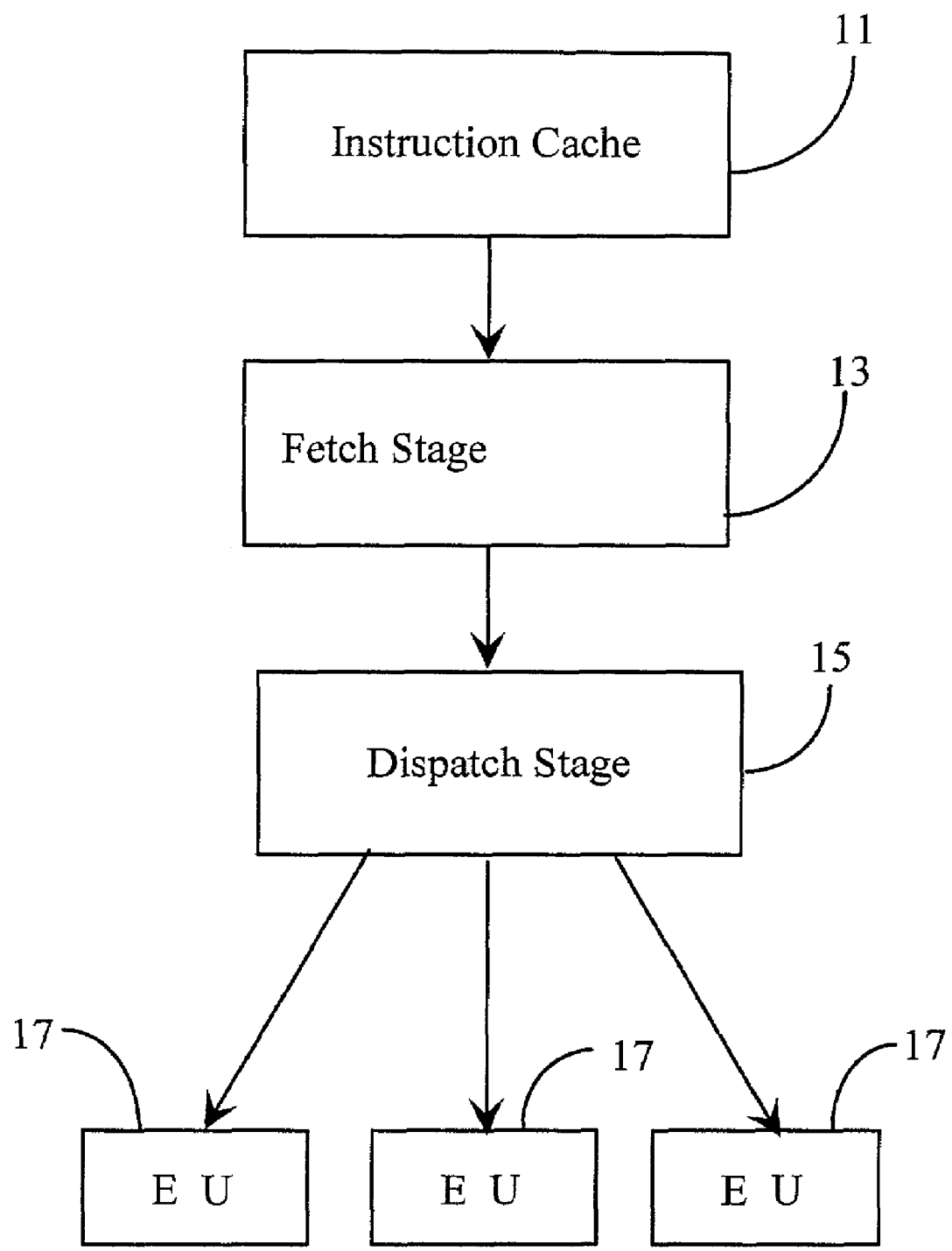
FIG. 1 is a block diagram depicting a pipelined structure for a processor in the prior art.

FIG. 1 is a block diagram depicting a pipelined structure for a processor in the prior art. In this prior art structure there is an instruction cache 11, wherein instructions await selection for execution, a fetch stage 13 which selects and fetches instruction into the pipeline, and a dispatch stage which dispatches instructions to execution units (EUs) 17. In many conventional pipelined structures there are additional stages other than the exemplary stages illustrated here.

In the simple architecture illustrated in FIG. 1 everything works in lockstep. In each cycle an instruction is fetched and, and another previously fetched instruction is dispatched to one of the execution units.

Figure 2:
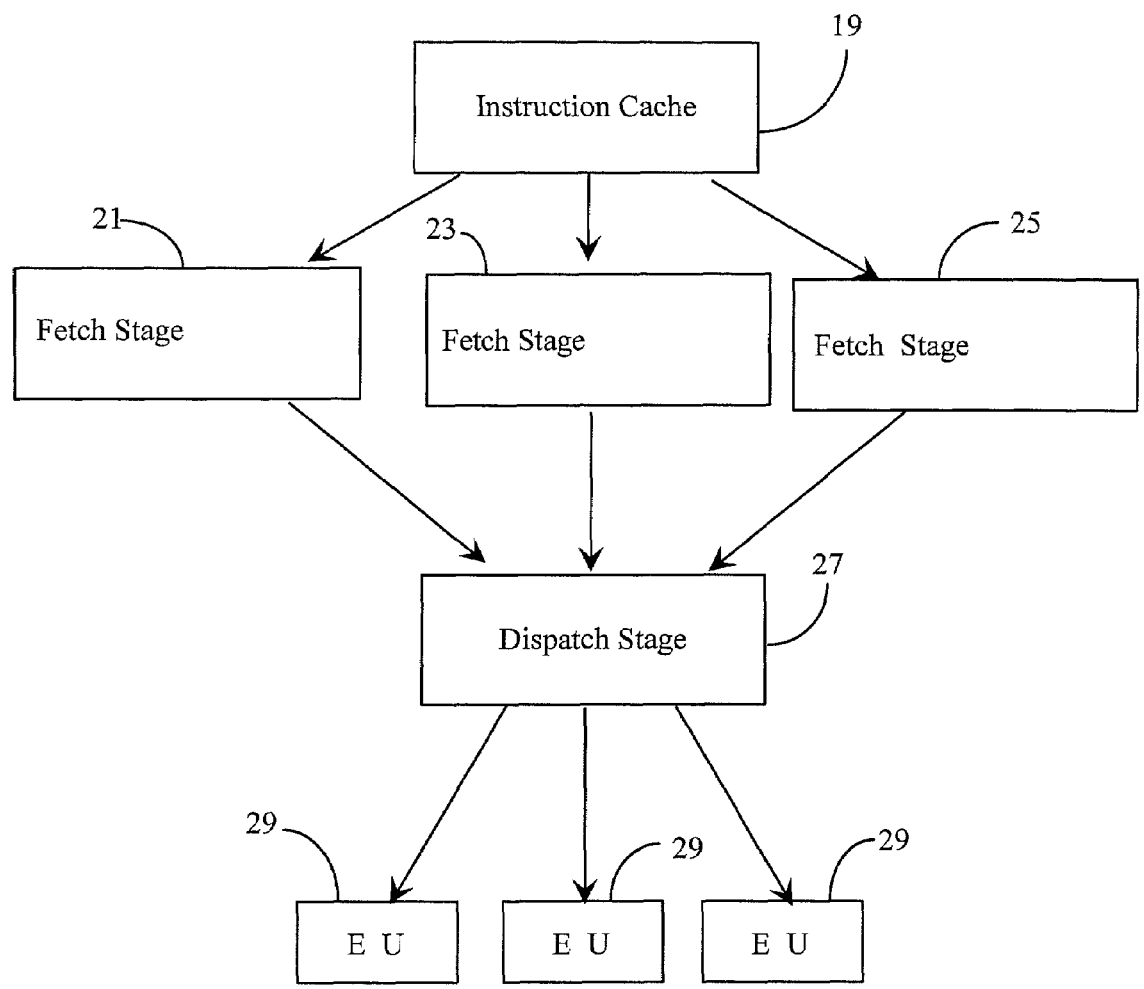
FIG. 2 is a block diagram depicting a pipelined structure for a multistreaming processor known to the present inventors.

FIG. 2 is a block diagram depicting a pipelined structure for a multistreaming processor known to the present inventors, wherein a single instruction cache 19 has ports for three separate streams, and a fetch is made per cycle by each of three fetch stages 21, 23 and 25 (one for each stream). In this particular case a single dispatch stage 27 selects instructions from a pool fed by the three streams and dispatches those instructions to one or another of three execution units 29. In this architecture the fetch and dispatch units are still directly coupled. It should be noted that the architecture of FIG. 2, while prior to the present invention, is not necessarily in the public domain, as it is an as-yet proprietary architecture known to the present inventors. In another example, there may be separate caches for separate streams, but this does not provide the desired de-coupling.

Figure 3:
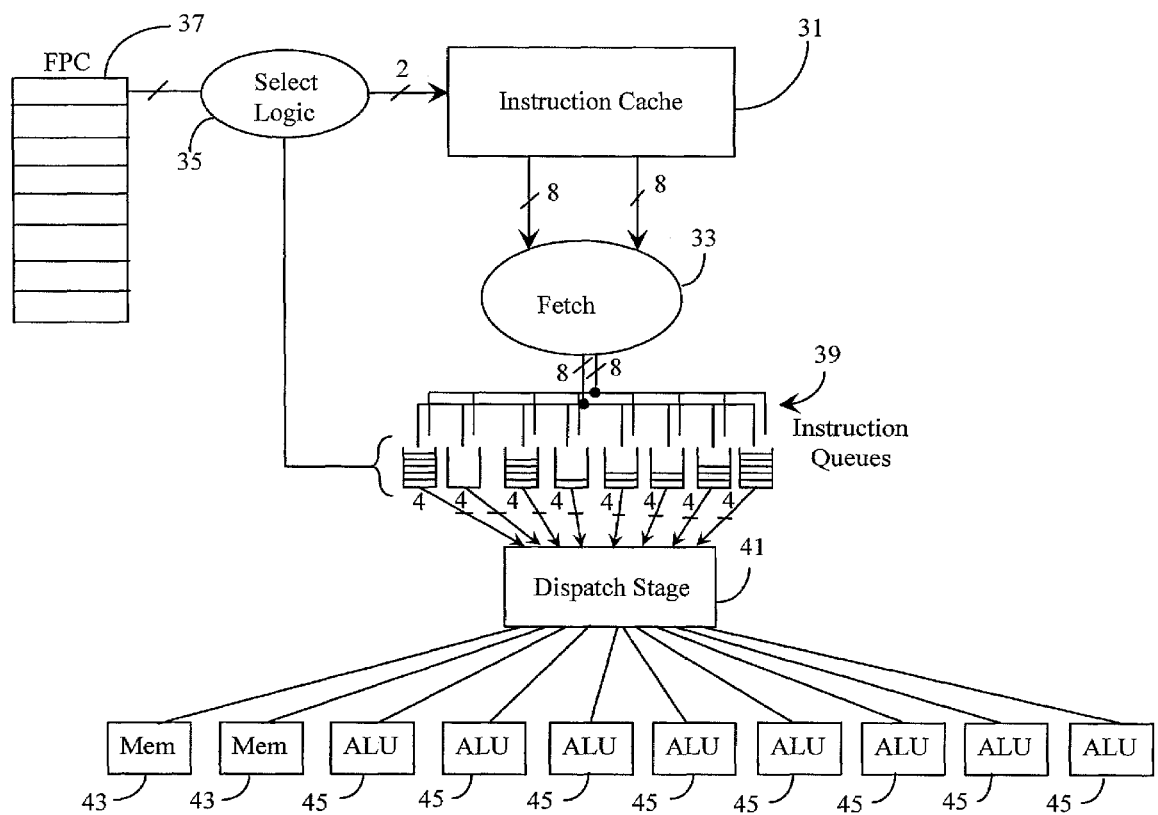
FIG. 3 is a block diagram for a pipelines architecture for a multistreaming processor according to an embodiment of the present invention.

FIG. 3 is a block diagram depicting an architecture for a dynamic multistreaming (DMS) processor according to an embodiment of the present invention. In this DMS processor there are eight streams and ten functional units. Instruction cache 31 in this embodiment has two ports for providing instructions to fetch stage 33. Eight instructions may be fetched each cycle for each port, so 16 instructions may be fetched per cycle.

In a preferred embodiment of the present invention instruction queues 39 are provided, which effectively decouple fetch and dispatch stages in the pipeline. There are in this embodiment eight instruction queues, one for each stream. In the example of FIG. 3 the instruction queues are shown in a manner to illustrate that each queue may have a different number of instructions ready for transfer to a dispatch stage 41.

Referring again to instruction cache 31 and the two ports to fetch stage 33, it was described above that eight instructions may be fetched to stage 33 via each port. Typically the eight instructions for one port are eight instructions from a single thread for a single stream. For example, the eight instructions fetched by one port in a particular cycle will typically be sequential instructions for a thread associated with one stream.

Determination of the two threads associated with two streams to be accessed in each cycle is made by selection logic 35. Logic 35 monitors a set of fetch program counters 37, which maintain a program counter for each stream, indicating at what address to find the next instruction for that stream. Select logic 35 also monitors the state of each queue in set 39 of instruction queues. Based at least in part on the state of instruction queues 39 select logic 35 determines the two threads from which to fetch instructions in a particular cycle. For example, if the instruction queue in set 39 for a stream is full, the probability of utilizing eight additional instructions into the pipeline from the thread associated with that stream is low. Conversely, if the instruction queue in set 39 for a stream is empty, the probability of utilizing eight additional instructions into the pipeline from the thread associated with that stream is high.

In this embodiment, in each cycle, four instructions are made available to dispatch stage 41 from each instruction queue. In practice dispatch logic is provided for selecting from which queues to dispatch instructions. The dispatch logic has knowledge of many parameters, typically including priorities, instruction dependencies, and the like, and is also aware of the number of instructions in each queue.

As described above, there are in this preferred embodiment ten execution units, which include two memory units 43 and eight arithmetic logic units (ALUs) 45. Thus, in each cycle up to ten instructions may be dispatched to execution units.

In the system depicted by FIG. 3 the unique and novel set of instruction queues 39 provides decoupling of dispatch from fetch in the pipeline. The dispatch stage now has a larger pool of instructions from which to select to dispatch to execution units, and the efficiency of dispatch is improved. That is the number of instructions that may be dispatched per cycle is maximized. This structure and operation allows a large number of streams of a DMS processor to execute instructions continually while permitting the fetch mechanism to fetch from a smaller number of streams in each cycle. Fetching from a smaller number of streams, in this case two, in each cycle is important, because the hardware and logic necessary to provide additional ports into the instruction cache is significant. As an added benefit, unified access to a single cache is provided.

Thus the instruction queue in the preferred embodiment allows fetched instructions to be buffered after fetch and before dispatch. The instruction queue read mechanism allows the head of the queue to be presented to dispatch in each cycle, allowing a variable number of instructions to be dispatched from each stream in each cycle. With the instruction queue, one can take advantage of instruction stream locality, while maximizing the efficiency of the fetch mechanism in the presence of stalls and branches. By providing a fetch mechanism that can support up to eight instructions from two streams, one can keep the instruction queues full while not having to replicate the fetch bandwidth across all streams.

The skilled artisan will recognize that there are a number of alterations that might be made in embodiments of the invention described above without departing from the spirit and scope of the invention. For example, the number of instruction queues may vary, the number of ports into the instruction cache may vary, the fetch logic may be implemented in a variety of ways, and the dispatch logic may be implemented in a variety of ways, among other changes that may be made within the spirit and scope of the invention. For these and other reasons the invention should be afforded the broadest scope, and should be limited only by the claims that follow.

What is claimed is:

1. A pipelined multistreaming processor, comprising:
    an instruction cache configured to concurrently provide a plurality of instructions for a plurality of instruction streams;
    fetch logic coupled to the instruction cache configured to concurrently fetch said plurality of instructions for the plurality of instruction streams from the instruction cache, wherein said plurality of instructions includes at least two instructions for a first instruction stream of the plurality of instruction streams;
    a plurality of instruction queues coupled to the fetch logic wherein each one of the plurality of instruction queues is associated with at least one of the plurality of instruction streams, wherein the number of the plurality of instruction queues is greater than the plurality of instruction streams that are provided by the instruction cache;

a dispatch stage coupled to the plurality of instruction queues and configured to select and dispatch instructions for the plurality of instruction streams.

2. The processor of claim 1 wherein the fetch logic is further configured to concurrently store fetched instructions into ones of the plurality of instruction queues that are associated with a subset of the plurality of instruction streams.

3. The processor of claim 1 further comprising select logic coupled to the instruction cache and to the plurality of instruction queues, said select logic configured to:

monitor each of the plurality of instruction queues; and based on the monitoring, select the subset of the plurality of instruction streams for which to fetch instructions from the instruction cache.

4. The processor of claim 3 wherein the select logic is further configured to:

monitor a plurality of program counters (FPC), each of the plurality of program counters associated with one of the plurality of instruction streams and configured to store an address associated with the next instruction to be fetched, for the one of the plurality of instruction streams; and direct fetching from the instruction cache at addresses stored in the plurality of program counters.

5. The processor of claim 3 wherein the select logic is further configured to select the subset of the plurality of instruction streams for which to fetch instructions, wherein the subset comprises those instruction streams whose associated queues are least full.

6. The processor of claim 1 wherein the dispatch logic dispatches instructions to a set of execution units.

7. The processor of claim 6 wherein the fetch logic is coupled to the instruction cache via a number of ports, wherein said number of ports is less than the number of instructions dispatched by the dispatch stage to the set of execution units in each cycle.

8. The processor of claim 7 wherein by providing said plurality of instruction queues to decouple the fetch logic from the dispatch stage, and by providing the select logic to monitor said queues and select ones of the plurality of instruction streams for fetching, the processor allows a large number of streams in the processor to execute while minimizing the number of ports provided by the instruction cache.

9. The processor of claim 8 wherein the plurality of instruction queues is at least four, and the number of ports provided by the instruction cache is greater than one, but less than four.

10. The processor of claim 9 wherein the dispatch logic is further configured to dispatch a variable number of instructions from each queue in each cycle.

11. In a multistreaming processor, the processor executing a plurality of instruction streams, a method for decoupling fetching of instructions for the plurality of instruction streams from the dispatch of those instructions for execution, the method comprising:

concurrently fetching a plurality of instructions from an instruction cache for the plurality of instruction streams, wherein the plurality of instructions includes at least two instructions for a first instruction stream of the plurality of instruction streams;

providing a plurality of instruction queues, wherein each instruction queue is associated with at least one of the plurality of instruction streams, wherein the number of the plurality of instruction queues is greater than the plurality of instruction streams; and selecting and dispatching instructions from the instruction queues for the plurality of instruction streams.

12. The method of claim 11 further comprising concurrently storing fetched instructions into ones of said plurality of instruction queues that are associated with a subset of the plurality of instruction streams.

13. The method of claim 11 further comprising:

monitoring each of the plurality of instruction queues;

based on the monitoring, selecting the subset of the plurality of instruction streams for which to fetch instructions from the instruction cache.

14. The method of claim 13 further comprising:

monitoring a plurality of program counters (FPC), each of said plurality of program counters associated with one of the plurality of instruction streams and configured to store an address associated with the next instruction to be fetched, for the one of the plurality of instruction streams; and direct fetching from the instruction cache at addresses stored in said plurality of program counters.

15. The method of claim 13 further comprising selecting the subset of the plurality of instruction streams for which to fetch instructions, wherein the subset comprises those instruction streams whose associated queues are least full.

16. The method of claim 11 further comprising dispatching instructions to a set of execution units.

17. The method of claim 16 further comprising fetching instruction from said instruction cache via a number of ports, wherein said number of ports is less than the number of instructions dispatched to the set of execution units in each cycle.

18. The method of claim 17 wherein by providing said plurality of instruction queues, and by monitoring said queues and selecting ones of said plurality of instruction streams for fetching, the processor allows a large number of streams in the processor to execute while minimizing the number of ports provided by said instruction cache.

19. The method of claim 18 wherein said plurality of instruction queues is at least four, and the number of ports provided by said instruction cache is greater than one, but less than four.

20. The method of claim 19 further comprising dispatching a variable number of instructions from each queue in each cycle.

* * * * *